United States Patent
Black et al.

(10) Patent No.: US 9,281,849 B2
(45) Date of Patent: Mar. 8, 2016

(54) METHOD AND APPARATUS FOR COMPENSATING FOR PHASE SHIFT IN A COMMUNICATION DEVICE

(75) Inventors: Gregory R. Black, Vernon Hills, IL (US); Armin W. Klomsdorf, Chicago, IL (US); William P. Alberth, Jr., Prairie Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/478,811

(22) Filed: May 23, 2012

(65) Prior Publication Data

US 2013/0315285 A1 Nov. 28, 2013

(51) Int. Cl.
*H04L 27/28* (2006.01)
*H04B 1/04* (2006.01)
*H04B 1/18* (2006.01)

(52) U.S. Cl.
CPC .............. *H04B 1/0458* (2013.01); *H04B 1/18* (2013.01)

(58) Field of Classification Search
CPC ...... H04B 1/0458; H04B 1/0053; H04B 1/18; H03H 7/40; H03H 7/38; H03H 11/28; H03H 9/02433; H03F 2200/451
USPC ............ 375/260, 274, 295, 316, 354; 455/73, 455/77, 78, 107, 126, 297
See application file for complete search history.

(56) References Cited

U.S. PATENT DOCUMENTS

| | | |
|---|---|---|
| 7,486,941 B2 | 2/2009 | Rahman et al. |
| 7,973,725 B2 | 7/2011 | Qi et al. |
| 8,068,798 B2 | 11/2011 | Wilcox et al. |
| 8,285,224 B2 * | 10/2012 | Kondo et al. .................... 455/73 |
| 8,310,401 B2 | 11/2012 | Qi et al. |
| 8,320,850 B1 | 11/2012 | Khlat |
| 8,462,057 B2 | 6/2013 | Qi et al. |

(Continued)

FOREIGN PATENT DOCUMENTS

| | | | | |
|---|---|---|---|---|
| GB | 1298810 | * | 4/2003 | ............... H04B 1/38 |
| JP | 2003-318689 A | | 11/2003 | |

(Continued)

OTHER PUBLICATIONS

Patent Cooperation Treaty; International Search Report and Written Opinion of the International Searching Authority for International Patent Application No. PCT/US2013/031143; Aug. 1, 2013.

(Continued)

*Primary Examiner* — Dhaval Patel
(74) *Attorney, Agent, or Firm* — Faegre Baker Daniels LLP

(57) ABSTRACT

A method and apparatus for compensating is described, in which a tuning network is electrically coupled to an antenna and to a phase shift network. Baseband signals travel to and from the phase shift network. A controller communicatively linked to the tuning network and to the phase shift network receives data regarding the state of a communication device. The controller changes the impedance of the tuning network, and changes the phase shift of the phase shift network based on the received data. The received data may include information regarding the channel, band, or sub-band on which a communication device is communicating; information regarding on the application state of the device; information regarding the modulator and demodulator state of the device; and information regarding the state of the communication device's antenna.

20 Claims, 11 Drawing Sheets

(56) References Cited

U.S. PATENT DOCUMENTS

| | | |
|---|---|---|
| 8,503,689 B2 | 8/2013 | Schreuder et al. |
| 8,599,077 B2 | 12/2013 | Qi et al. |
| 8,706,053 B2 | 4/2014 | Camp, Jr. et al. |
| 2002/0114444 A1 | 8/2002 | Anderson et al. |
| 2004/0127178 A1 | 7/2004 | Kuffner |
| 2005/0245204 A1 | 11/2005 | Vance |
| 2007/0142014 A1 | 6/2007 | Wilcox |
| 2008/0280570 A1 | 11/2008 | Blin |
| 2010/0073103 A1 | 3/2010 | Spears et al. |
| 2010/0127945 A1 | 5/2010 | Rousu et al. |
| 2010/0197261 A1* | 8/2010 | Zibrik et al. ............... 455/232.1 |
| 2010/0273441 A1 | 10/2010 | Dubash et al. |
| 2012/0063368 A1 | 3/2012 | Boyle |
| 2012/0300870 A1* | 11/2012 | Dickey ......................... 375/295 |
| 2013/0069737 A1* | 3/2013 | See et al. ........................ 333/32 |
| 2013/0251010 A1 | 9/2013 | Alberth et al. |
| 2013/0315285 A1 | 11/2013 | Black et al. |

FOREIGN PATENT DOCUMENTS

| | | |
|---|---|---|
| WO | 2006107841 A2 | 10/2006 |
| WO | 2011/148225 A1 | 12/2011 |

OTHER PUBLICATIONS

Patent Cooperation Treaty; International Search Report and Written Opinion of the International Searching Authority for International Patent Application No. PCT/US2013/051922; Oct. 30, 2013.

Patent Cooperation Treaty, International Search Report and Written Opinion of the International Searching Authority for International Application No. PCT/US2013/040237, Jul. 9, 2013, 11 pages.

* cited by examiner

| FIG. 10A |
| FIG. 10B | ics
METHOD AND APPARATUS FOR COMPENSATING FOR PHASE SHIFT IN A COMMUNICATION DEVICE

TECHNICAL FIELD

The present invention relates generally to antenna tuning and, more particularly, to compensating for phase shifts that result from antenna tuning.

CROSS REFERENCE TO RELATED APPLICATIONS

The present application is related to U.S. patent application Ser. No. 13/429,806 filed on Mar. 26, 2012, entitled METHOD AND APPARATUS FOR COMPENSATING FOR PHASE SHIFT IN A COMMUNICATION DEVICE, by Black, et al.

BACKGROUND

As mobile communication has become increasingly sophisticated, antenna tuning techniques have become more advanced. Antenna tuning involves matching the impedance of the load of the components connected to an antenna to the impedance of the antenna itself. The antenna impedance may be affected by the state of the communication device (e.g., cell phone), which can be based on a variety of factors, including the position of the communication device with respect to the user's body. When the impedance of the antenna changes, it is desirable to tune the antenna (e.g. by changing the impedance of the load) in order to keep the impedances as closely matched as possible. However, when the impedance of the load changes, the phase of the signals travelling to and from the antenna also tends to change. Unfortunately, phase changes in mobile communication signals are interpreted as meaningful data which can degrade the reception of the signal, and lead to garbled transmissions. There are certain scenarios in which impedance changes and the associated phase changes can be anticipated and tolerated by the communication system. One example is when the channel being used for communication changes. During a channel change, the transmit modulator and receive modulator generally perform a channel estimate which is used to set up the use of the channel by the communication device. Should the phase change occur before the channel estimate, or while the transmitter is not emitting a signal then the phase change will have no affect on the received signal at the base station. Subsequent insertion phase changes of the channel such as those due receiver mobility and multipath channel fading are also tolerated by the receiver. However, when other more abrupt changes in impedance occur during the transmission of data such as from antenna impedance tuning, it is much more difficult for the base station receiver to react to the resulting phase shift and the quality of the received signal could be degraded.

BRIEF DESCRIPTION OF THE DRAWINGS

Various embodiments of the present invention will be described below in more detail, with reference to the accompanying drawings.

It is to be noted, however, that the appended drawings illustrate embodiments of this invention and are therefore not to be considered limiting of its scope, for the invention may admit to other equally effective embodiments.

DETAILED DESCRIPTION

In accordance with the foregoing, a method and apparatus for compensating for a phase shift is disclosed herein. In an embodiment of the invention, a communication device operating in a communication system includes a tuning network electrically coupled to its antenna and to its transceiver module, a phase shift network that receives baseband signals, and a controller communicatively linked to both the tuning network and to the phase shift network. The controller receives data regarding the state of the communication device. Based on the received data, the controller operates the tuning network to change the impedance of the tuning network so that its impedance more closely matches that of the antenna than before the change. The controller also, based on the received data, operates the phase shift network to change the phase shift of the phase shift network, so that the phase shift network can shift the phase of the baseband signals in order to compensate for a phase shift caused by the change in impedance of the tuning network. The data may include information regarding the channel, band, or sub-band on which the communication device is communicating; information regarding the application for which the communication device is being used; the state of the receive demodulator and/or transmit modulator of the device; and the state of the antenna of the communication device.

In another embodiment of the invention, a method for compensating for a phase shift involves receiving data regarding the band, sub-band or channel over which a communication device is communicating, the state of a transmit modulator and receive demodulator being used by the communication device to transmit or receive, and/or the application for which the communication device is being used (e.g., voice application, left-hand, right-hand, or data). The impedance of a matching network and the phase shift of a phase shift network are adjusted based on this data.

Figure 1:
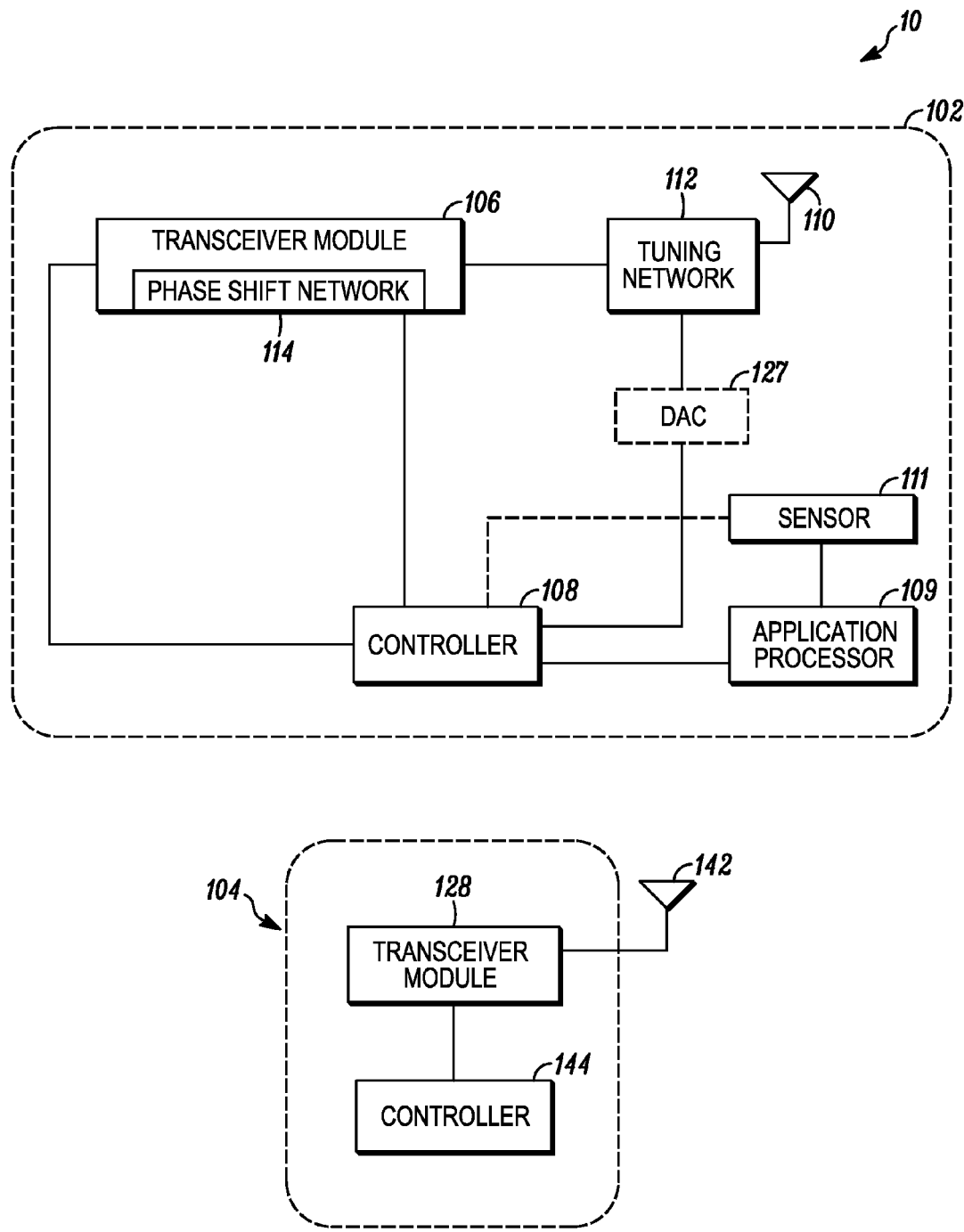
FIG. 1 is an example of a communication system in which the invention may be implemented.

An example of a communication system in which the invention may be implemented will now be described. Referring to FIG. 1, the communication system, generally labeled 10, includes a communication device 102 and a base station 104. The communication device 102 may be any of a variety of devices, including a cell phone (smartphone or otherwise), a dongle, a notebook computer, or tablet computer. Similarly, the base station 104 may be any of a variety of devices, including a base station of a cellular network, a wireless access point, or a communication device acting as a wireless access point. In one embodiment, the communication device 102 is a 4G Long-Term Evolution (LTE) phone and the base station 104 is a base station of a 4G LTE network. The communication device 102 includes an antenna 110, a variable tuning network 112 electrically coupled to the antenna 110, and a transceiver module 106 electrically coupled to the tuning network 112 The transceiver module 106 includes a phase shift network 114. Although these components are depicted as being next to one another, it is understood that there may be many intervening components that will still permit the components of FIG. 1 to be electrically coupled, meaning that electrical signals from one component will reach another component, even if the electrical signals pass through intermediate elements.

The communication device 102 also includes a controller 108 communicatively linked to the transceiver module 106, the phase shift network 114 and the tuning network 112. The communication device 102 further includes an application processor 109 communicatively linked to the controller 108 as well as to other components of the communication device 102, such as to a sensor 111 (e.g., a proximity sensor) that detects conditions that are being experienced by the communication device 102, such as the physical position of the communication device 102. For example, the sensor 111 can detect antenna states and conditions that affect antenna performance. The controller 108 operates the tuning network 112 to change the impedance of the tuning network so that its impedance more closely matches the impedance of the antenna 110 than prior to the change. In one embodiment, the default impedance of the transceiver module 106 is about 50 ohms, and the impedance of the antenna 110 is a complex impedance other than 50 ohms. To carry out tuning in one embodiment, the controller 108 operates the tuning network 112 to change its input impedance to 50 ohms and operates the tuning network 112 to change its output impedance to the complex conjugate of the antenna impedance, which is the impedance needed to maximize the transfer of power into and out of the antenna 110. Thus, the tuning network 112 transforms the antenna impedance to 50 ohms, thereby 'matching' the impedance of transceiver 106 with that of the antenna 110. As will be discussed below in more detail, the phase shift network 114 compensates for changes in phase that can occur due to changes in the tuning network 112.

Referring still to FIG. 1, the transceiver module 106 converts digital signals into analog signals and vice-versa to facilitate the transmission and receipt of communication by the communication device 102. The application processor 109 executes application programs to control various functions of the communication device 102, such as displaying pictures and text on a display, facilitating voice calls, setting up data connections, etc. The controller 108 controls the operation of the transceiver module 106, the phase shift network 114 and the tuning network 112.

The base station 104 includes a transceiver module 128 and a controller 144 communicatively linked to the transceiver module 128. The base station further includes an antenna 142, which is electrically coupled to the transceiver module 128. The transceiver module 128 converts digital signals into analog signals and vice-versa to facilitate the transmission and receipt of communication by the base station 104. The controller 144 controls the operation of the transceiver module 128.

Referring still to FIG. 1, a basic description of how data moves back and forth between the communication device 102 and the base station 104 in an embodiment of the invention will now be described. It is understood that this is a high-level description and that there may be many other steps involved in the communication. The transceiver module 106 formats the data into a well-known message format, and converts the digital signals into radio frequency (RF) signals. The phase shift network 114 may advance or retreat the phase of the signal by a known amount. The phase shifted RF signals pass to the tuning network 112. The phase of the signal passing between the transceiver module 106 and the tuning network 112 can be referred to "input phase." The tuning network 112 is operable to adjust its impedance to the complex conjugate of the antenna 110 to optimize the ability of the antenna 110 to radiate a signal that can be received by the base station 104. The phase of the signal leaving the tuning network 112 and being radiated by the antenna 110 can be referred to as the "output phase." The difference between the output and input phases (e.g., output phase−input phase) can be referred to as the "insertion phase." The radiated signal is received by the base station antenna 142, and then passes to the transceiver module 128, which demodulates and recovers the original data, which then is passed to the controller 144.

The controller 108 controls the tuning network 112 and the phase shift network 114. If the controller 108 adjusts the tuning network 112 while a signal is being transmitted by the communication device 102, the controller 108 determines the phase shift, P, that will result from the tuning network adjustment. The "phase shift" is the difference between the insertion phase prior to the tuning network adjustment and the insertion phase after the tuning network adjustment. The controller 108 determines the amount of the phase shift based on the state of the communication device 102. The state of the communication device may be determined base on one or more of the following factors: (1) the band, sub-band or channel on which the communication device is communicating, (2) the application for which the communication device is being used, (3) the state of the antenna, (4) the state of a transmit modulator and receive modulator (to be discussed in conjunction with FIG. 2) of the communication device 102. The controller 108 then determines the required control signals to send to the phase shift network 114 to change its phase by an amount −P. Thus, with a signal passing through the phase shift network 114 with a phase −P and the tuning network 112 having a phase shift P, the net phase shift of the transmitted signal will be −P+P=0, thereby shielding the base station 104 from a phase shift that could adversely affect the received signal quality.

Furthermore, the signal takes a fixed and known time to propagate between the phase shift network 114 and the tuning network 112. The controller 108 can adjust the settings of the phase shift network 114 at a time T, and then wait to adjust the tuning network 112 for a time delay D, where the time delay equals the propagation delay from the phase shift network 114 to the tuning network 112. In this way the resulting transmitted signal will show minimal phase shift from the tuning network adjustment event.

It is also possible to operate the antenna tuning network 112 first at a time T2, and then adjust the phase shift network 114 after a time delay D where D is the propagation time between the tuning network 112 and the phase shift network 114. In this way the signal received by the base station 104 will show minimal phase shift from the tuning network adjustment event.

Figure 2:
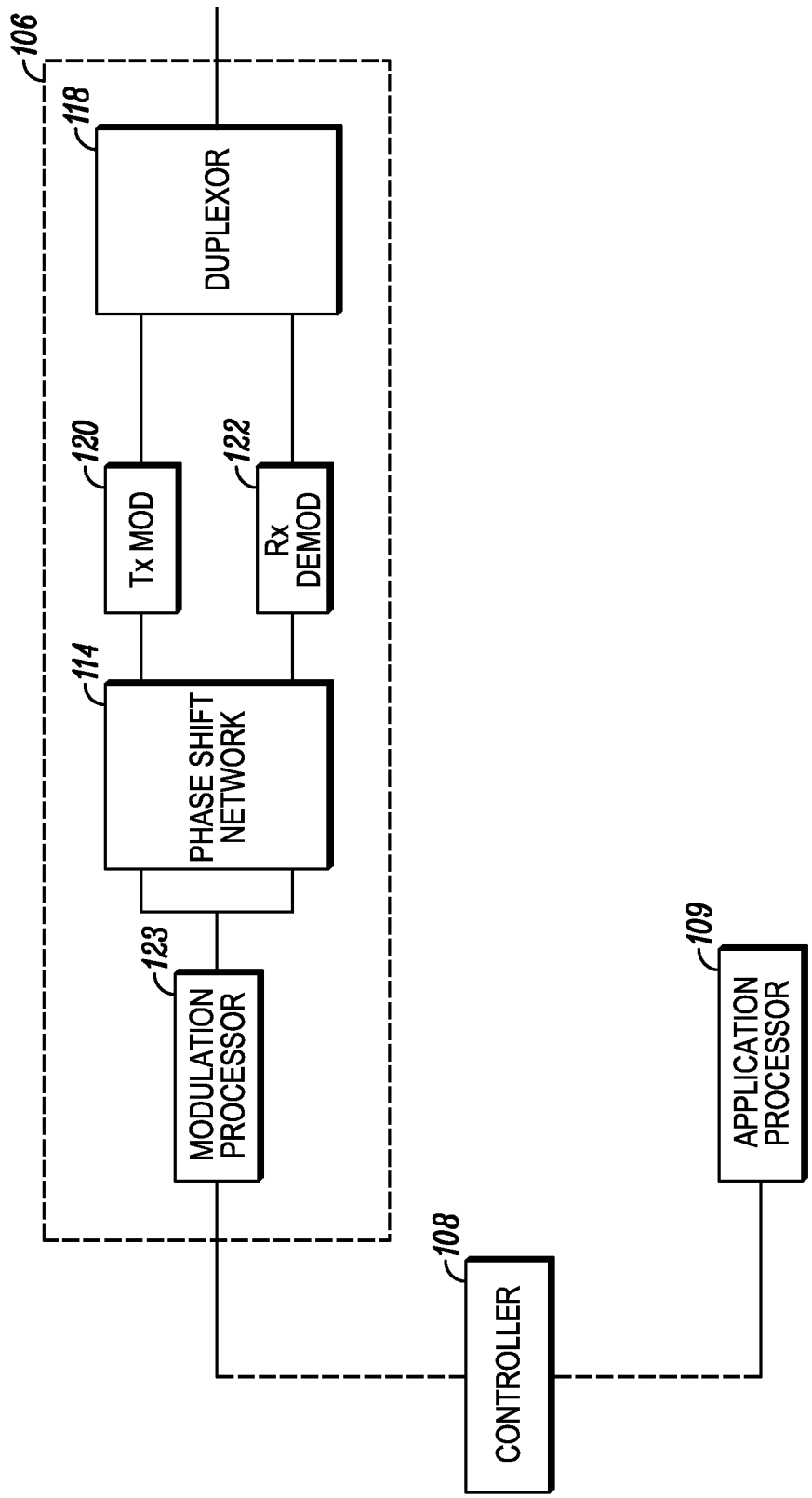
FIG. 2 shows components of a communication device according to an embodiment of the invention.

Referring to FIG. 2, a more detailed description of the architecture of the transceiver module 106 (from FIG. 1)

according to an embodiment of the invention will now be provided. The transceiver module 106 includes a duplexor 118, a transmission (Tx) modulator 120 communicatively linked to the duplexor 118, and a receiver (Rx) demodulator 122 also communicatively linked to the duplexor 118. The transceiver module 106 also includes the phase shift network 114, which is communicatively linked to the Tx modulator 120 and the Rx demodulator 122. The transceiver module 106 further includes a modulation processor 123 (also referred to as a baseband processor) communicatively linked to the phase shift network 114. The duplexor 118 combines and separates the signals coming from and going to the Rx demodulator 122 and the Tx modulator 120 respectively, enabling the communication device 102 to both transmit and receive simultaneously. The modulation processor 123 also controls the band, sub-band or channel on which the Tx modulator 120 and the Rx demodulator 122 communicate. The modulation processor 123 is communicatively linked to the controller 108. The modulation processor 123 sends data through the phase shift network 114 to the Tx modulator 120, which converts the data into a format for transmission via the antenna 110. Conversely, the Rx demodulator 122 converts signals received via the antenna 110 into information that passes through the phase shift network 114 and travels to the modulation processor 123 for processing. Upon processing the information, the modulation processor 123 transmits the information to the controller 108. The modulation processor 123 sends data indicating which band, sub-band, and/or channel on which the communication device 102 is communicating. The modulation processor 123 may also send data regarding the state of the Tx modulator 120 and the Rx demodulator 122 (e.g., Rx favored, Tx favored, or balanced), to the controller 108. The application processor 109 sends information regarding the application state (e.g. the position of the communication device 102 relative to the user, an indication of which application program the application processor is executing) to the controller 108.

Figure 5:
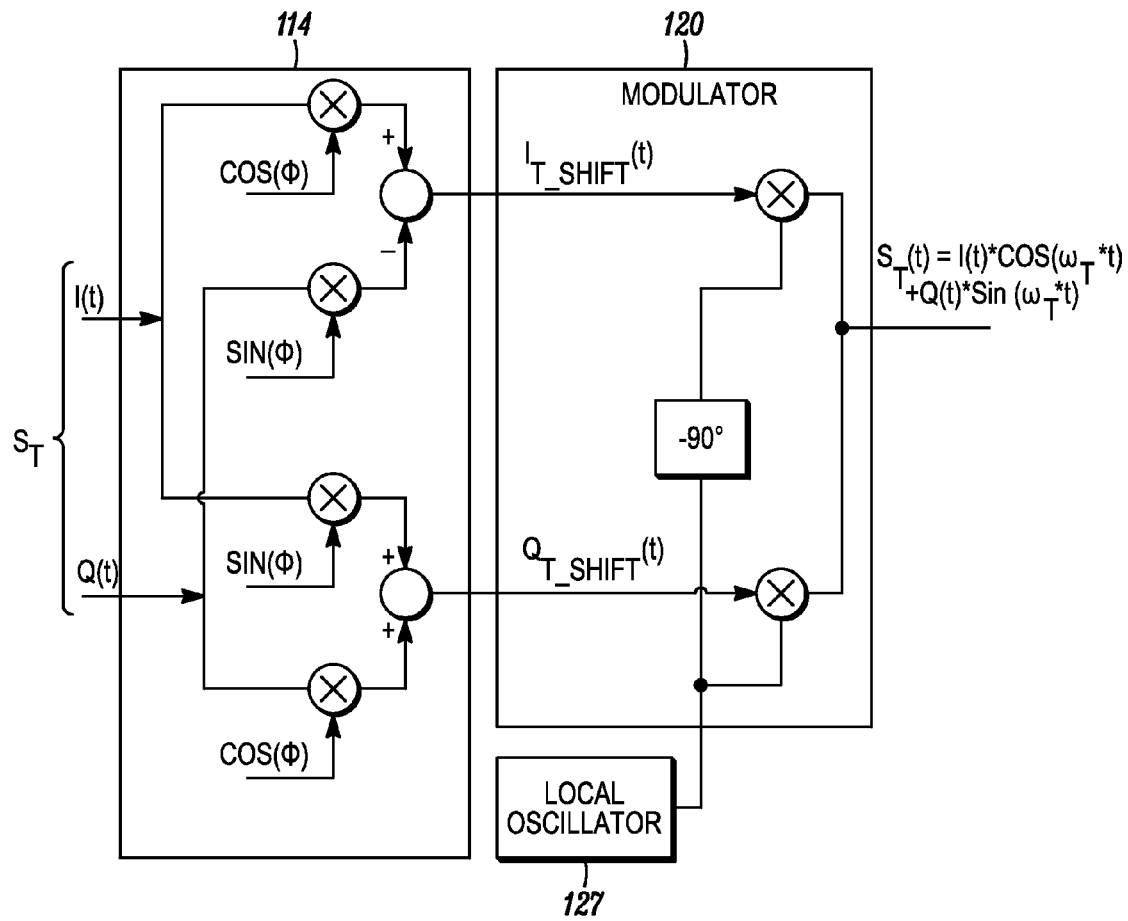
FIG. 5 shows a transmit modulator with a transmit portion of a phase shift network according to an embodiment of the invention.
Figure 6:
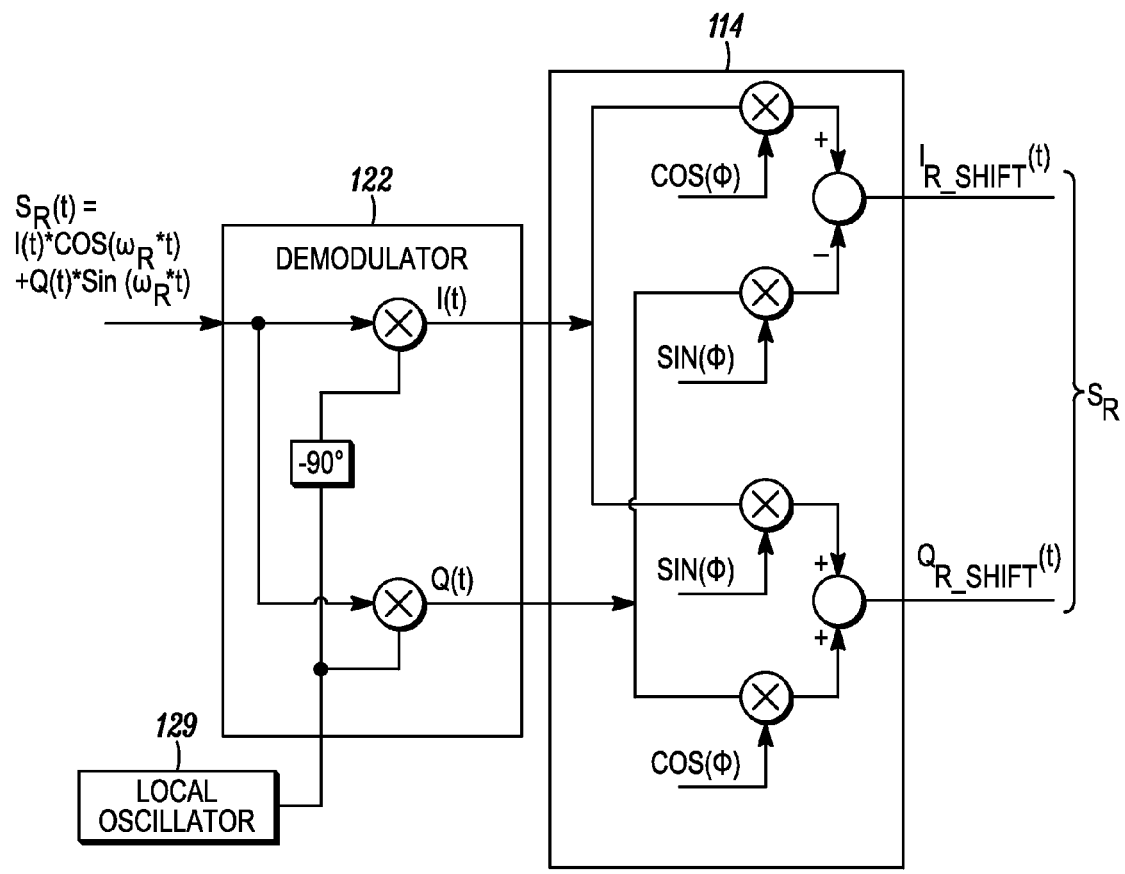
FIG. 6 shows a receive demodulator with a receive portion of a phase shift network according to an embodiment of the invention.

Referring to FIGS. 5 and 6, the operation of the phase shift network 114, the Tx modulator 120, and the Rx demodulator 122 according to an embodiment of the invention will now be described in more detail. The signal going between modulation processor 123, Tx modulator 120, and Rx demodulator 122 includes the Tx and Rx signals. The Tx signal, $S_T$, which is a baseband signal, travels out of modulation processor 123 and into Tx modulator 120 via the phase shift network 114 (FIG. 5). The Rx signal, $S_R$, which is a baseband signal, travels out of Rx demodulator 122 and into modulation processor 123 via the phase shift network 114. Local oscillator 127 provides an RF carrier signal to modulator 120 having frequency $\omega_T$. Local oscillator 129 (FIG. 6) provides an RF carrier signal to demodulator 125 having requency $\omega_R$. Thus, $S_T$ (t) and $S_R$ (t) are RF signals, having frequency $\omega$ and $\omega_0$ respectively.

$S_T$ and $S_R$ are complex waveforms represented by an in-phase (I) and quadrature (Q) signal. Thus the transmit signal $S_T$ is represented by in-phase transmit signal $I_T$, and quadrature transmit signal $Q_T$, and the receive signal $S_R$ is represented by in-phase receive signal $I_R$, and quadrature receive signal $Q_R$:

$$S_T = I_T + j^* Q_T$$

$$S_R = I_R + j^* Q_R$$

Similarly, the phase shifted Tx signal, $S_{T\_SHIFT}$, is represented by an in-phase (I) signal, $I_{T\_SHIFT}$, and a quadrature (Q) signal, $Q_{T\_SHIFT}$, and the phase shifter Rx signal, $S_{R\_SHIFT}$, is represented an in-phase (I) signal, $I_{R\_SHIFT}$, and a quadrature (Q) signal, $Q_{R\_SHIFT}$ $$S_{T\_SHIFT} = I_{T\_SHIFT} + j^* Q_{T\_SHIFT}$$

$$S_{R\_SHIFT} = I_{R\_SHIFT} + j^* Q_{R\_SHIFT}$$

In an embodiment of the invention, complex arithmetic processing is employed to implement the phase shift network 114. When multiplying two complex numbers the magnitudes multiply and the phases add. Thus the phase of a complex signal is shifted by an amount of phase shift, $\phi$, by multiplying by a multiplicand with magnitude of 1 and phase $\phi$. In complex form the multiplicand is $Cos(\phi)+j^*Sin(\phi)$. Thus a Tx portion of the phase shift network 114 (FIG. 5) can shift the phase of transmit signal by complex multiplication by with a multiplicand of $Cos(\phi)+j^*Sin(\phi)$, as follows:

$$I_{T\_SHIFT} = I_T^* Cos(\phi) - Q_T^* Sin(\phi)$$

$$Q_{T\_SHIFT} = I_T^* Sin(\phi) + Q_T^* Cos(\phi).$$

Similarly an Rx portion of the phase shift network 114 (FIG. 6) can shift the phase of receive signal by complex multiplication by with a multiplicand of $Cos(\phi)+j^*Sin(\phi)$, as follows:

$$I_{R\_SHIFT} = I_R^* Cos(\phi) - Q_R^* Sin(\phi)$$

$$Q_{R\_SHIFT} = I_R^* Sin(\phi) + Q_R^* Cos(\phi).$$

In practice the Tx and Rx portions of the phase shift network 114 can be accomplished on the Tx and Rx digital baseband signals using Sine and Cosine lookup tables and digital multipliers. This can be done using discrete hardware or in a microprocessor that would be integrated within the phase shift network 114.

Simpler implementations of the Tx and Rx portions of the phase shift network 114 employing fewer multiplication steps are possible. In an embodiment of the invention, a multiplicand $1+j^*Tan(\phi)$ is employed in the phase shift network 114, which results in fewer multiplications:

$$I_{SHIFT} = I - Q^* Tan(\phi)$$

$$Q_{SHIFT} = I^* Tan(\phi) + Q.$$

In this case a phase shift of $\phi$ is achieved, but the output magnitude is not the same as the input magnitude. In another embodiment, a coordinated rotational digital computer (CORDIC) can be employed which does not require any multipliers.

The value of phase shift $\phi$ may vary in time in order to more exactly cancel a time varying phase shift caused by the variable tuning network 112 (FIG. 1). The phase shift network 114 can also provide frequency translation. Referring to FIG. 5 and FIG. 6, the amount of phase shift is determined by the $sin(\phi)$ and $cos(\phi)$ signals If these are static signals then the phase shift network 114 just changes the phase by an amount $\phi$. However $\phi$ can be time varying. If $\phi(t)=\omega^*t+\Phi_0$ then the frequency is shifted by an amount $\omega$ and the phase is shifted by an amount is $\phi_0$ In this way, phase control can be accomplished with in-phase and quadrature signals which, instead of being baseband signals, are intermediate frequency signals or RF signals.

Figure 3:
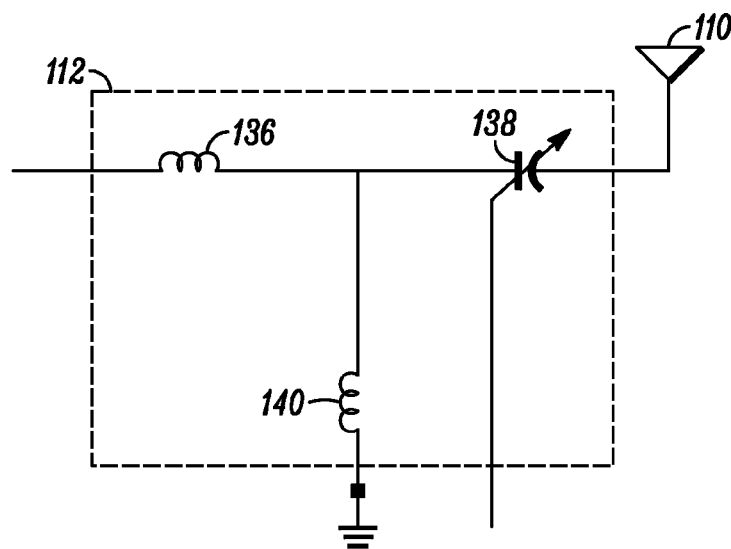
FIG. 3 shows a circuit layout of a variable tuning network according to an embodiment of the invention.

Referring to FIG. 3, a circuit implementation of the tuning network 112 according to an embodiment of the invention will now be described. The tuning network 112 provides a complex conjugate match between the impedance of the transceiver module 106, typically 50 ohms, and the complex impedance of the antenna 110. Different antenna designs can be employed, each having particular tuning requirements. In an embodiment, a planar inverted 'L' antenna (PILA) is employed. In this embodiment, the tuning network 112 includes a circuit that has a first inductive element 136, a variable capacitive element 138 electrically coupled to the first inductive element 136, and a second inductive element 140 electrically coupled to the first inductive element 136 and the variable capacitive element 138 as well as to ground. The antenna 110 is electrically coupled to each of the aforementioned elements of tuning network 112. The variable capacitive element 138 may be implemented in a variety of ways, including a switched bank of capacitors or a capacitor with variable dielectric such as barium strontium titanate (BST) or a varactor diode.

Figure 4:
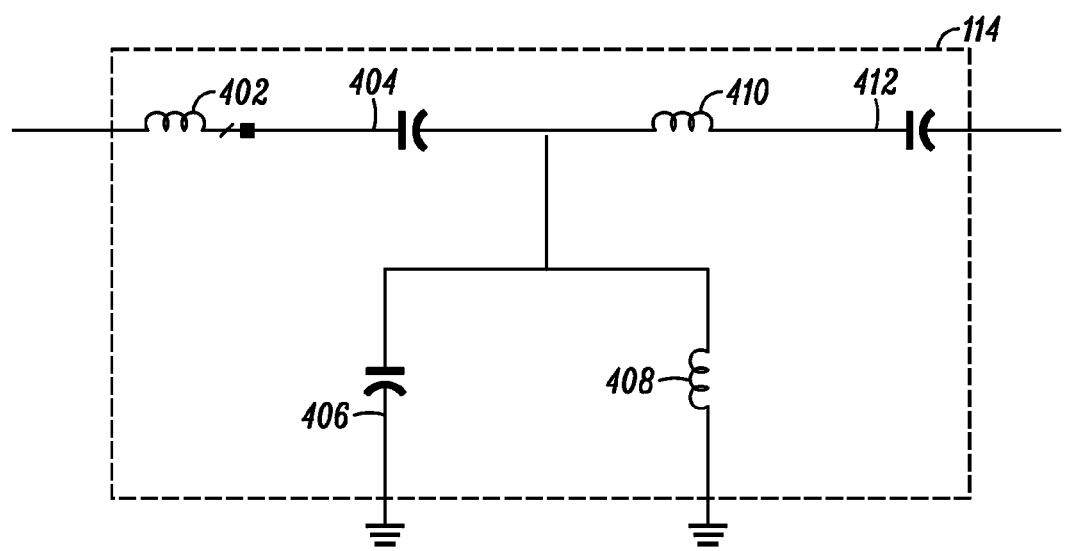
FIG. 4 shows a circuit layout of a tunable phase shift network according to an embodiment of the invention.

The phase shift network 114 (FIGS. 1 & 2) can be implemented in a variety of ways. In an embodiment, tunable lumped element filters can be employed in high pass or low pass configurations of lumped elements, wherein the operating frequency is above the high pass corner frequency, or below the low pass corner frequency. In this way the phase can be adjusted without significantly changing the amplitude. In some cases, high pass and low pass configurations will result in a phase control range that is insufficient over a large operating frequency range. In applications requiring large operating frequency ranges, a high-pass/low-pass configuration can be employed. Referring to FIG. 4, a circuit implementation of the Tx portion and the Rx portion of the phase shift network 114 according to a high-pass/low-pass embodiment of the invention will now be described. In this embodiment, a high pass response is provided for low band operating frequencies in the range of 700 to 1000 MHz, and a low pass response is provided for high band operating frequencies in the range of 1700 to 2200 MHz. In this way a useful degree of phase control range can be provided, such as ninety degrees, at each operating frequency. In this embodiment the phase shift network 114 comprises a first inductor 402 and a first capacitor 404 which may be tunable, electrically coupled in series. The first inductor 402 and first capacitor 404 are electrically coupled to a second inductor 406 and to a second capacitor 408, which may be tunable. The second capacitor 408 is connected in shunt to ground. The second inductor 406 and the second capacitor 408 are electrically coupled to a third inductor 410 and a third capacitor 412, which may be tunable. The third inductor and third capacitor are electrically coupled in series. The transceiver module (FIG. 1) 106 is electrically coupled to the first inductor 402 and to the first capacitor 404. The Tx modulator 120 and the Rx demodulator are electrically coupled (via the duplexor 118) to the third inductor 410 and the third capacitor 412, which are electrically coupled in series. The variable capacitive elements 404, 408 and 412 may be implemented in a variety of ways, including a switched bank of capacitors or a capacitor with variable dielectric such as barium strontium titanate (BST) or a varactor diode. In some embodiments only series capacitors 404 and 412 are tunable. In other embodiments only shunt capacitor 408 is tunable.

The phase shift network 114 (FIGS. 1 and 2) is controlled to cancel phase shifts occurring as a result of changes made to the tuning network 112. The phase shift can be calculated by analyzing the combined transfer function of the tuning network 112 and the antenna 110 (FIG. 1). To calculate the transfer function, an equivalent circuit of antenna 110 is generated to match the measured impedance and to provide an analog of measured efficiency of the antenna 110. Antenna impedance and radiation efficiency can vary depending on user positions, such as free-space and hand-held positions, or talking positions in close proximity to the user's head. Different equivalent circuits of antenna 110 can be generated to match the impedance and radiated efficiency of the antenna in different user positions.

Figure 7:
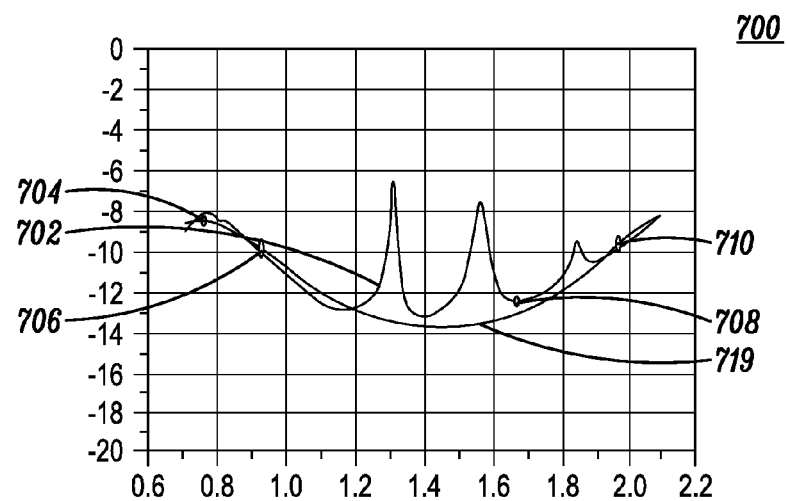
FIG. 7 shows data regarding a planar inverted L (PILA) embodiment of the antenna 110 of FIG. 1.
Figure 7:
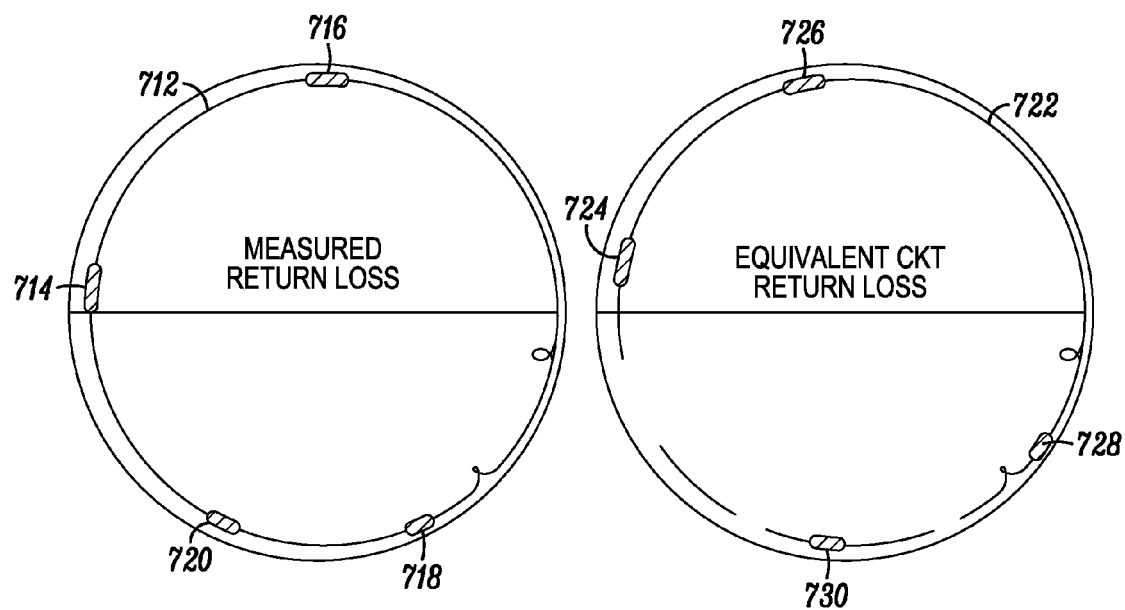

Referring to FIG. 7, antenna data 700 is shown for a planar inverted "L" (PILA) embodiment of antenna 110. Curve 702 is the delivered power magnitude in dB units of a PILA embodiment of the antenna 110 measured in free space. Curve segments shown in bold highlight the bands of interest on the delivered power curve 702. Curve segment 704 is the delivered power in a first band of interest from 745 to 760 MHz. Curve segment 706 is the delivered power in a second band of interest from 900 to 915 MHz. Curve segment 708 is the delivered power in a third band of interest from 1710 to 1725 MHz. Curve segment 710 is the delivered power in a fourth band of interest from 1965 to 1980 MHz. Curve 712 is the PILA antenna return loss measured in free space, plotted on a Smith chart. Return loss, $\Gamma$, is related to input impedance by the relationship, $\Gamma = (Z_{ANT} - Z_{SOURCE})/(Z_{ANT} + Z_{SOURCE})$, where $Z_{ANT}$ is the impedance of the antenna 110 and $Z_{SOURCE}$ is the output impedance of the transceiver module 106, typically 50 Ohms. Curve segment 714 is the return loss in a first band of interest from 745 to 760 MHz. Curve segment 716 is the return loss in the second band of interest from 900 to 915 MHz. Curve segment 718 is the return loss in the third band of interest from 1710 to 1725 MHz. Curve segment 720 is the return loss in the fourth band of interest from 1965 to 1980 MHz.

Figure 8:
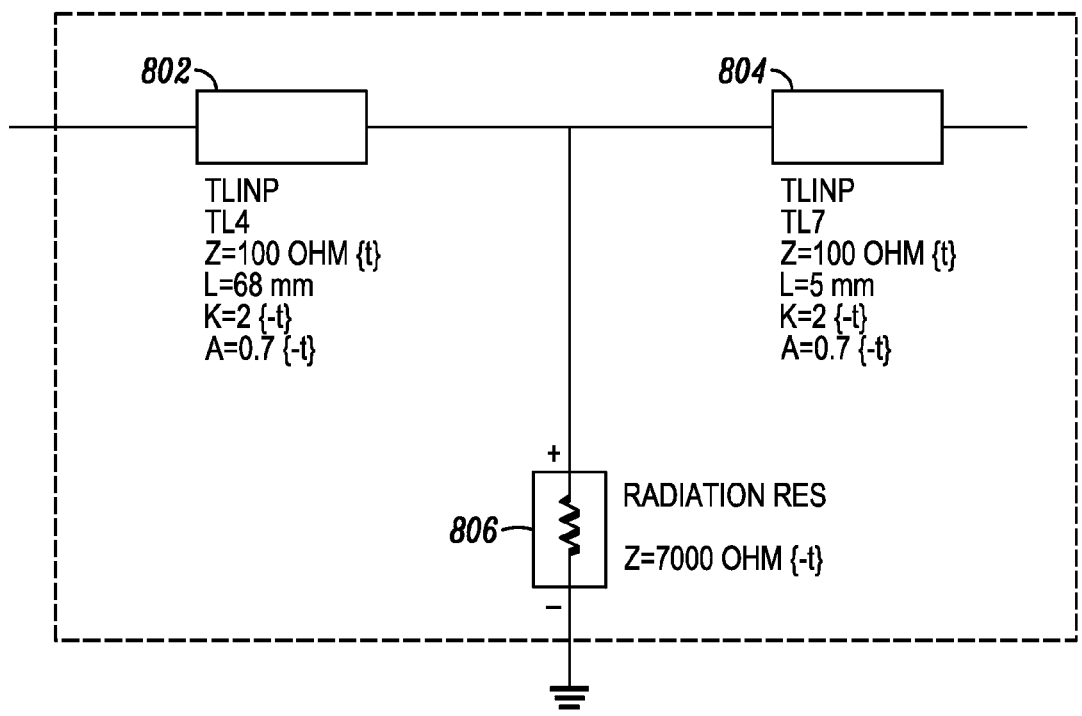
FIG. 8 shows an approximate equivalent circuit of the PILA embodiment of FIG. 7.

Referring now to FIG. 8, an approximate equivalent circuit 800 of the PILA embodiment of the antenna 110 is shown. The equivalent circuit is used to approximate the phase shift of the antenna 110 and the tuning network 112 caused by changes in the tuning network 112. The phase shift is the phase of the transfer function from the output of the transceiver module 106 to the radiated signal. In the equivalent circuit, the power dissipated in a radiation resistor serves as an analog of the radiated signal power. The equivalent circuit 800 comprises a first transmission line 802, a second transmission line 804, and a radiation resistor 806. Circuit parameters, such as the value of the radiation resistor 806, and the transmission line 802 and 804 parameters, are adjusted to match the measured impedance data based on the curve segments 702 and 704 (FIG. 7) in the frequency bands of operation and a measured radiation efficiency of the PILA antenna of approximately 60%.

Referring again to FIG. 7, curve 720 shows the delivered power magnitude in dB units of the equivalent circuit of FIG. 4, where the circuit parameters are selected to match the measured delivered curve segments for the four bands of interest on delivered power curve 720. Curve segment 722 is the return loss of the equivalent circuit of FIG. 4 plotted on a Smith chart. Curve segment 724 is the return loss in a first band of interest from 745 to 760 MHz. Curve segment 726 is the return loss in the second band of interest from 900 to 915 MHz. Curve segment 728 is the return loss in the third band of interest from 1710 to 1725 MHz. Curve segment 730 is the return loss in the fourth band of interest from 1965 to 1980 MHz.

The equivalent circuit 800 (FIG. 8) can be analyzed to generate electrical data matching the measured electrical data of the PILA embodiment of the antenna 110 (FIG. 1) measured in free space, and similar equivalent circuits can be generated to match the electrical data of the antenna 110 measured in other user conditions, such as in mobile phone 'talking positions', in which the user's hand and head are proximate to the antenna near-field, and affect the measured impedance and efficiency.

Generally, antenna impedance is affected by the user's position. If the tuning circuit 112 (FIG. 1) is designed to optimally match the impedance of the antenna 110 in a first user position, it may not optimally match the impedance of the antenna 110 in a different user position. Thus the tuning circuit 112 can be adjusted to provide optimal matching designs for each user position. The phase shift that occurs when the tuning network 112 is changed is approximated by calculating the insertion phase through the tuning network 112 and the first transmission line 802 (FIG. 8) to the radiation resistor 806. For example, the tuning network 112 may be changed from a first state for interfacing to the antenna 110 in a free space position to a second state for interfacing to the antenna 110 in a right hand talking position. For each position, an optimum matching circuit is created by varying the tunable capacitor 138 in the tuning network 112.

Figure 9:
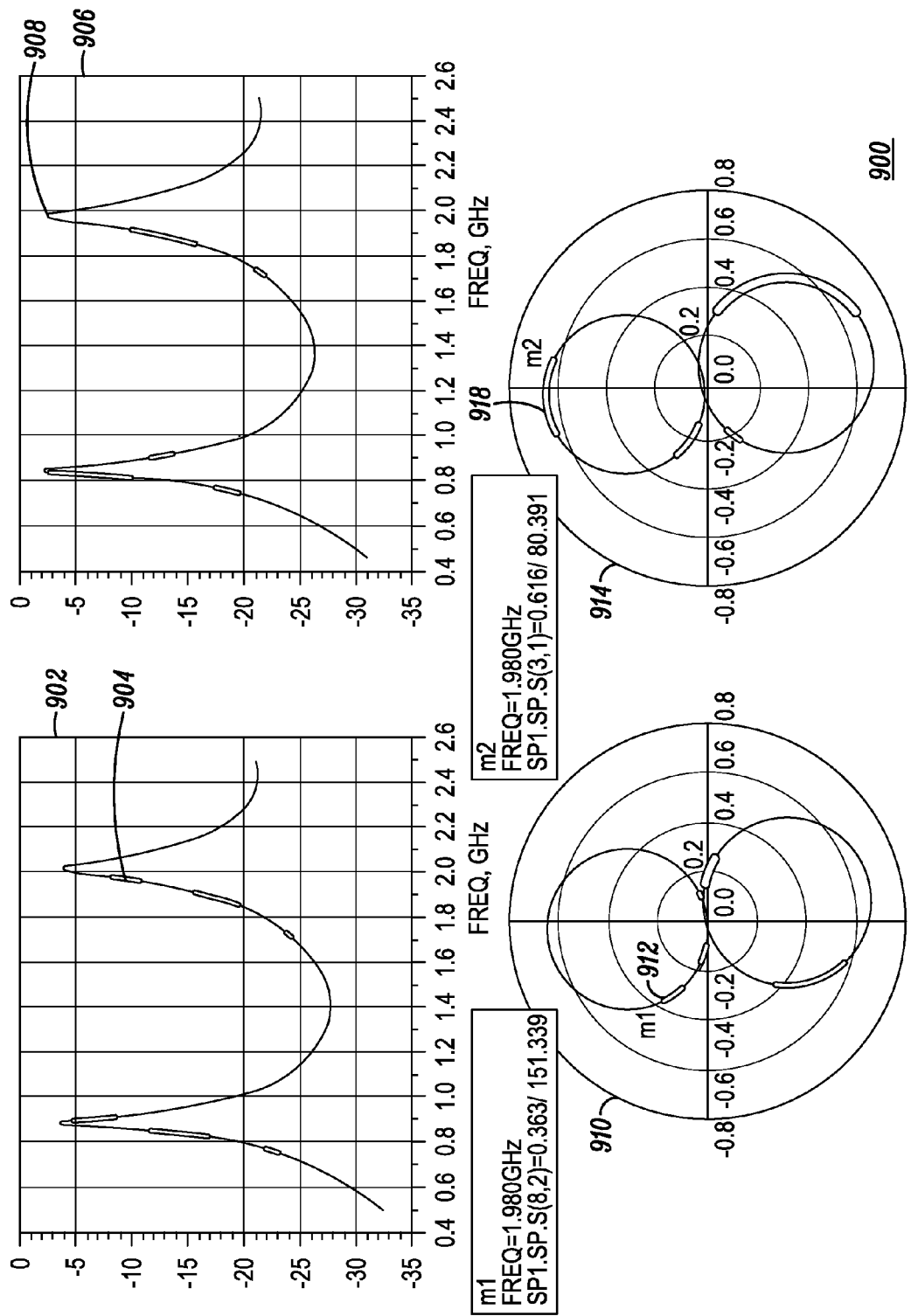
FIG. 9 shows simulation data that includes plots of transfer functions of the tuning network driving the antenna equivalent circuit of FIG. 8.

Referring to FIG. 9, simulation data 900 is shown which includes plots of transfer functions of the tuning network 112 (FIG. 1) driving the antenna equivalent circuit 800 (FIG. 8). In this particular simulation, the equivalent circuit 800 circuit parameters are adjusted for approximating the antenna 110 performance in a 'talking' user position, and design cases for the tuning network 112 are presented. In the first design case, the tuning network 112 is designed to maximize power transfer to a antenna 110 in a free space position in the fourth band of interest, from 1965 to 1980 MHz. In the second state, the tuning network 112 is designed to maximize power transfer to the antenna 110 in a user talking position in the fourth band of interest.

Referring again to FIG. 9, simulation data 900 is used to determine the change in insertion phase of the tuning network 112 (FIG. 1) driving the antenna equivalent circuit 800 (FIG. 8). Graph 902 shows the amplitude response from tuning network 112 designed to maximize power delivered to the antenna 110 in the free space condition, to the radiation resistor 806 of the PILA antenna equivalent circuit 800 in the talking position. The graph 902 amplitude response is an approximation of the antenna efficiency versus frequency for an antenna in the talking position, while the tuning network 112 is optimized for free space. Because the tuning network 112 is controlled to deliver maximum power into the antenna 110 in free space, while the antenna equivalent circuit 800 is selected to match the antenna performance in the user position, the antenna efficiency is degraded to −10 dB as indicated by curve segment 904 of the band of interest, 1965 to 1980 MHz, shown in bold. Graph 906 shows the amplitude response from the tuning network 112 designed to maximize power delivered to the antenna 110 in the talking position, wherein the user's head and right hand are located in the antenna near field, to the radiation resistor 806 of the PILA antenna equivalent circuit 800 in the talking position. The graph 906 amplitude response is an approximation of the antenna efficiency versus frequency of the antenna in talking position while the tuning network is optimized for the talking position. Because the tuning network 112 is controlled to deliver maximum power into the antenna 110 in the talking position and the antenna equivalent circuit 800 is selected to match the antenna performance in the talking position, the antenna efficiency is improved to −4 dB, as indicated by curve segment 908 of the band of interest, 1965 to 1980 MHz, shown in bold. Thus, changing the tuning network 112 from a free space optimized design to a user position optimized design causes the antenna efficiency to change from −10 dB to −4 dB, for a 6 dB improvement.

Simulation data 900 is used to determine the change in insertion phase that occurs when changing the tuning circuit 112 from a first state to a second state. The phase shift network 114 can be designed to cancel this change in insertion phase. Graphs 910 and 914 approximate antenna efficiency in polar form, from which we can determine the insertion phase of the tuning network 112 and the antenna 110. Graph 910 shows the polar form response from tuning network 112 designed to maximize power delivered to the radiation resistor 606 of the PILA antenna equivalent circuit 800 in the talking position. The graph 910 shows the insertion phase is approximately 150 degrees, as indicated by curve segment 912 of the band of interest, 1965 to 1980 MHz, shown in bold. Graph 916 shows the polar response from tuning network 112 designed to maximize power delivered to the radiation resistor 806 of the PILA antenna equivalent circuit 800 (FIG. 8) in the talking position. The graph 916 shows the insertion phase is approximately 80 degrees, as indicated by curve segment 918 of the band of interest, 1965 to 1980 MHz, shown in bold. By taking the difference from graphs 910 and 916, it can be determined that the change in insertion phase is −70 degrees. Thus, a change of approximately 70 degrees in the phase shift network 114 cancels the change in insertion phase of the tuning network 112 and the antenna 110.

Referring back to FIG. 1, the communication device 102 may include a digital to analog converter (DAC) 127 that is electrically coupled to both the controller 108 and the tuning network 112. If the variable capacitor 138 in tuning network 112 is made up of components that are switched in and out of circuit to adjust the desired response, such as a C2C network, then the DAC 127 is not required and a digital signal can be used control the tuning network 112. A C2C network is a network that has several elements including a capacitor of value C, a capacitor of value 2*C, a capacitor with value 4*C, and may include additional components. By switching in or out the different capacitors a wide variety of capacitance values may be achieved in the tuning network. If the tuning network 112 is composed of varactors, varactor-like elements, or other continuously tuning elements, then the DAC 127 will be used to convert the digital control signal in an analog control voltage.

To adjust the phase shift carried out by the phase shift network 114 and to adjust the impedance of the tuning network 112 according to an embodiment of the invention, the controller 108 receives Tx modulator/Rx demodulator state data from the transceiver module 106; band, sub-band or channel data from the transceiver module 106; application state data from the application processor 109; and antenna state data from the sensor 111. The controller 108 then uses the received data to reference a look-up table. The look-up table contains numerical values that indicate to the controller 108 what signals to send to the phase shift network 114 and to the tuning network 112. The lookup table and the values contained therein may be stored in a memory of the controller 108.

Figures 10, 10A:
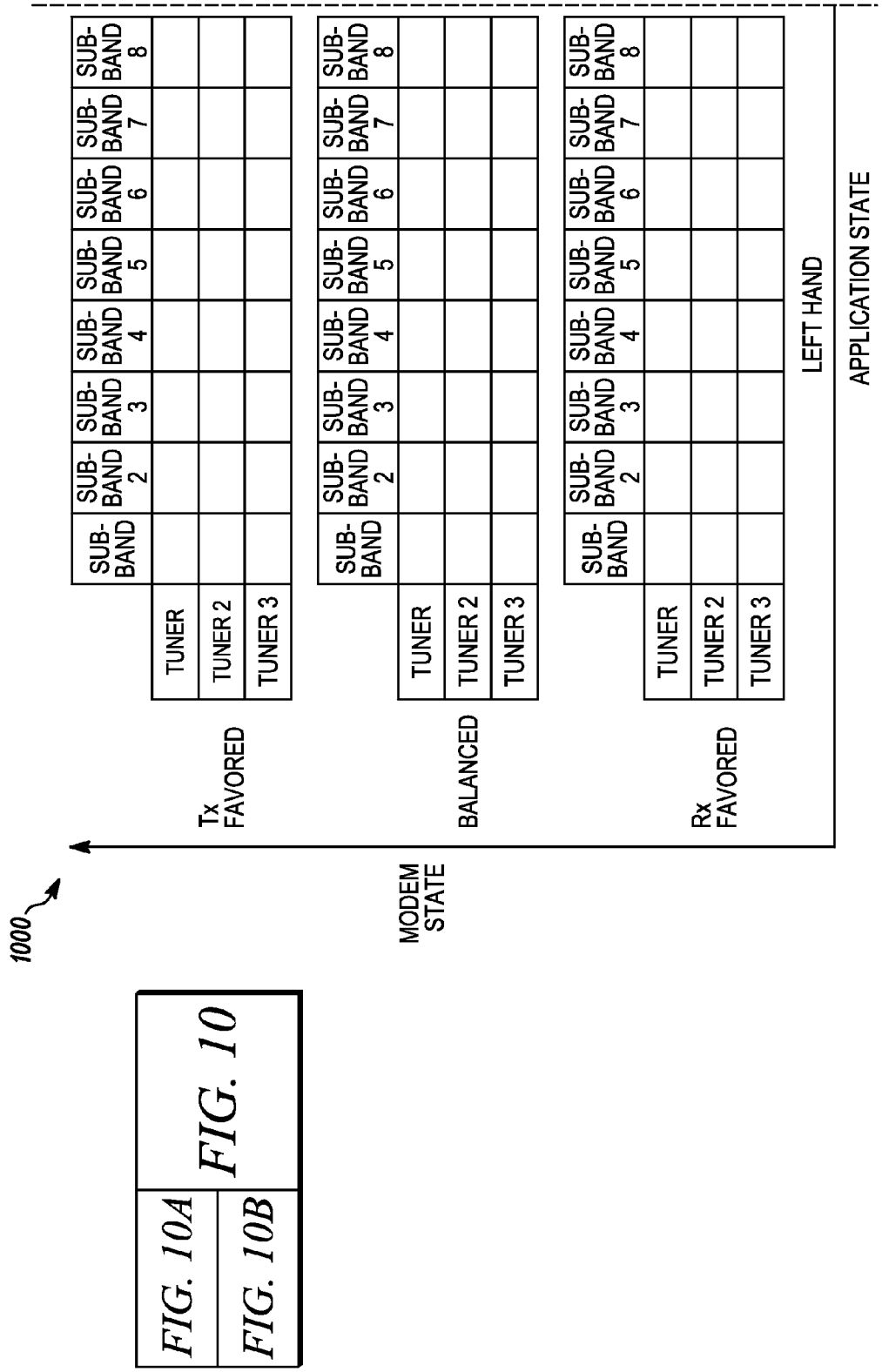
FIGS. 10A and 10B show an example of the structure of a lookup table in accordance with an embodiment of the invention.
Figure 10B:
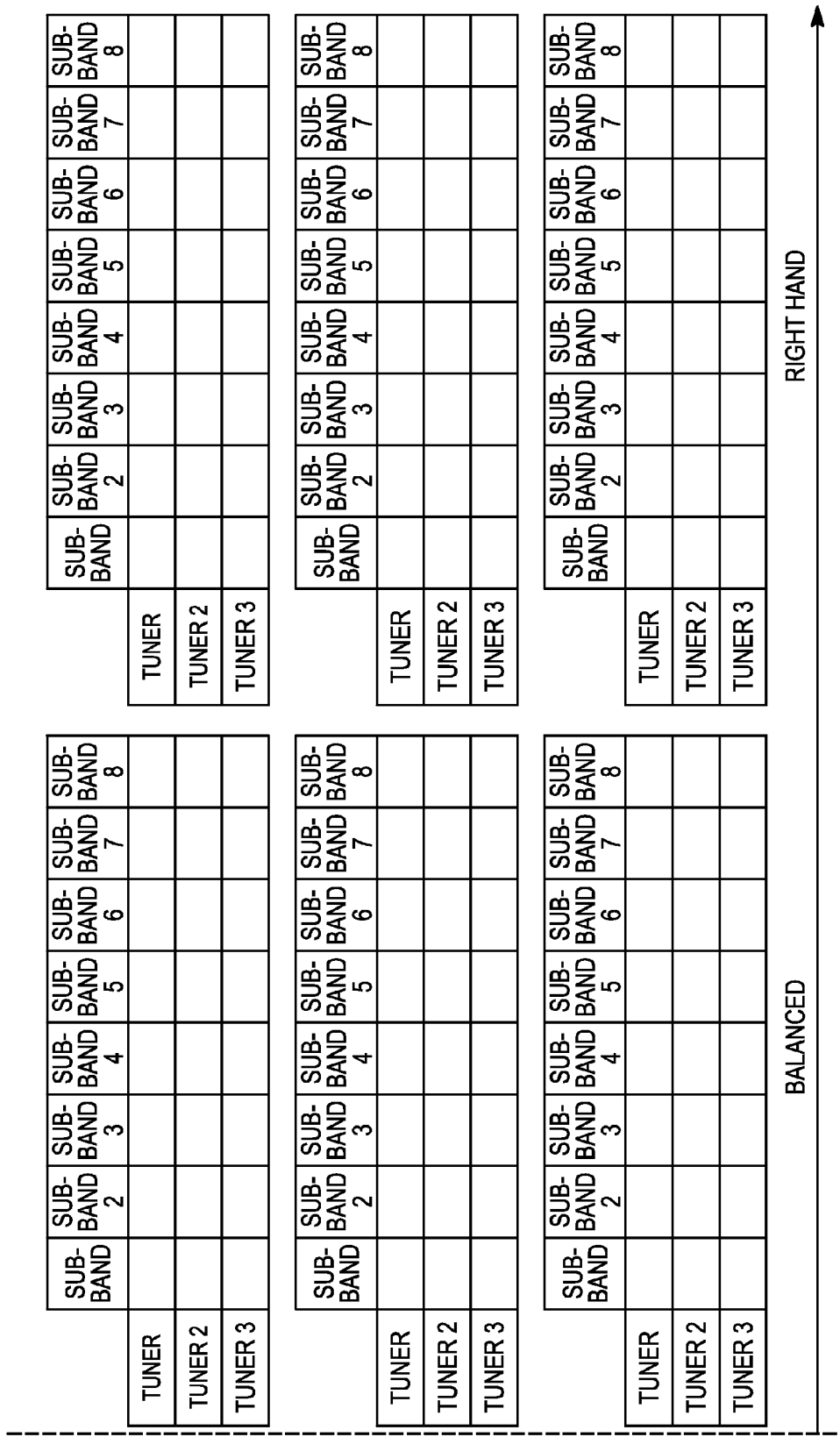

Referring to FIGS. 10A and 10B, an example of a lookup table in accordance with an embodiment of the invention will now be described. The lookup table, generally labeled 1000, may have three or more dimensions (frequency, sub-band, and the state of the tuning network 112 and the phase shift network 114), but is shown as a series of two-dimensional tables for the sake of clarity. The lookup table 900 associates the sub-band on which the communication device 102 (FIG. 1) operates, according to one of three Tx/Rx states: Rx Favored, Balanced, or Tx Favored. If the Tx modulator 120 (FIG. 2) is more challenged than the Rx demodulator 122 (e.g. the Tx modulator 120 is transmitting at maximum power but the Rx demodulator is below maximum power), then the Tx modulator and Rx demodulator will be in a Tx Favored state, such that the tuning network 112 and the phase shift network 114 will need to be put into a state that minimizes the loss on the transmit frequency. If the Rx demodulator 122 is more challenged than the Tx modulator 120 (e.g. the Rx demodulator 120 is experiencing bit and/or frame errors as a result of it being set at a level that is too sensitive), then the Tx modulator and Rx demodulator will be in an Rx Favored mode, such that the tuning network 112 and the phase shift network 114 will need to be adjusted to minimize the loss on the receive frequency. If the Tx modulator 120 and the Rx demodulator 122 are equally challenged then the Tx modulator and Rx demodulator are in a Balanced state.

The lookup table 1000 also associates the tuner and subband of the communication device 102 with one of three application states: Left Hand Talking Position, Balanced and Right Hand Talking Position. The communication device 102 is said to be in a Left Hand Talking Position state when the user is holding the communication device 102 to his head with his left hand, and in the Right Hand Talking Position state when the user is holding it to his head with his right hand. A balanced state is when the communication device 102 is not next the user's head, but is, for example, resting on a table. The sensor 111 (FIG. 1) detects (using, for example, proximity sensing electronics) the application state and provides this information to the application processor 109 which, in turn, provides the information to the controller 108.

Other Tx and Rx states are possible in the lookup table 1000. For instances, the Rx may be challenged while the Tx is enjoying very low link loss. In this mode, the antenna tuner would be adjusted to improve the Rx signal, possibly even at the expense of the transmit signal. Since the Tx signal is enjoying low loss, the transmit modulation could be set to a higher order such as 64 QAM. In this state, the base station receiver will have heightened sensitivity to phase shifts of the Tx signal. The phase shift network 114 could be operated to compensate for phase shifts of the Tx signal, while the tuning network 112 is operated to improve the quality of the Rx signal. Furthermore, other criteria to describe the communication state of the communication device 102 may be used to index the lookup table 1000 (e.g., be used as row, column or page labels), including the state of the antenna 110.

In an embodiment of the invention, the sensor 111 (FIG. 1) detects the state of antenna 110 directly by measuring electrical properties of the antenna 110, and provides this information to the application processor 109 which, in turn, provides the information to the controller 108. The controller 108 receives antenna 110 measurement data and uses the received data to reference a look-up table. The look-up table contains numerical values that indicate to the controller 108 what signals to send to the phase shift network 114 and to the tuning network 112. The lookup table and the values contained therein may be stored in a memory of the controller 108. Sensor 111 can detect an electrical property of the antenna 110, such as delivered power, reflected power, return loss or impedance using, for example, a directional coupler and measurement receiver. In this way, the electrical properties of the antenna 110 are measured directly to determine of the desired state of tuning network 112 and phase shift network 114, In another embodiment of the invention, the sensor 111 can feed back the antenna state to controller 108 directly as shown in phantom in FIG. 1 Controller 108 can include a closed loop controller for controlling tuning network 112 and phase shift network 114. For example sensor 111 can provide complex return loss data to controller 108, which translates the complex return loss to a corresponding value of insertion phase, and adjusts phase shift network 114 to cancel any changes in insertion phase due to changes in the state of tuning network 112. For example the controller 108 can perform a translation of complex return loss to insertion phase of antenna 110 by calculating the ratio of insertion phase to return loss in an antenna equivalent, such as circuit 800 (FIG. 8) in series with the tuning circuit 112 (FIG. 3). The phase shift network 114 is then adjusted to provide the negative of the calculated insertion phase. In this way, changes in antenna insertion phase can be cancelled in real time, to provide a constant antenna insertion phase.

Figure 11:
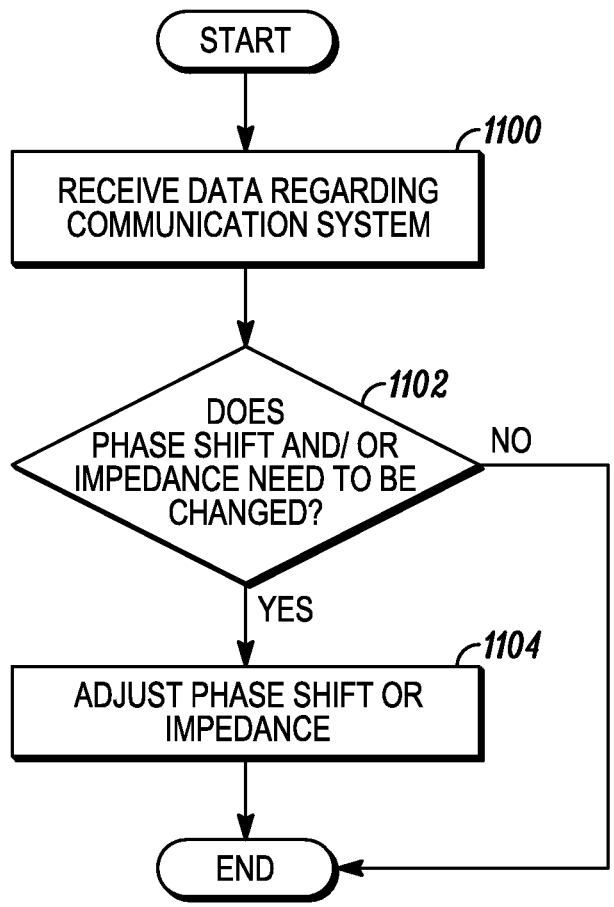
FIG. 11 shows steps that are carried out to compensate for phase shift according to an embodiment of the invention.

Referring to FIG. 11, an example of a procedure that is followed to compensate for phase shift according to an embodiment of the invention will now be described. At step 1100, the controller 108 (FIG. 1) receives data regarding the state of the communication system 10 (FIG. 1). This data may include data regarding the band, sub-band, or channel of on which the communication device 102 is communicating, data regarding the state of the Tx modulator 120 and the Rx demodulator 122 (FIG. 2), data regarding the application state (e.g. the physical position of the communication device 102 with respect to a user or the application being executed by the application processor 109), and antenna state (the state of the antenna 110, such as delivered power, reflected power, return loss or impedance). At step 1102, the controller 108 determines whether the impedance of the tuning network 112 and the phase shift carried out by the phase shift network 114, respectively, need to be changed. For example, the controller 108 may determine that the user has switched the phone from the left side of the head to the right side of the head. The device is transmitting on the lowest channel in the 800 MHz band (3GPP band 5). The Transmit and Received signals are balanced (both are of good quality). Upon detecting the change from the left side to the right side the controller would consult the table 1000 (FIGS. 10A and 10B) and recover the tuner setting for the sub band including 800 MHz lowest channel for the right side of the head, with balanced Rx and Tx. The controller would recall the present antenna tuner setting and calculate the phase change from the present setting to the new setting which for example may be 30 degrees. The controller then calculates a setting for the phase shift network that would result in a −30 degree phase shift. The new antenna tuner settings and phase shift settings are applied to the circuits. The result is improved link quality with minimal phase corruption to the signal. If the impedance and/or the phase shift needs to be changed, then the controller 108 makes the appropriate change at step 1004. If not, then the process ends.

Although a single phase shift network has been referred to herein, multiple phase shift networks may be used. For example, two phase shift networks may be employed, where the first phase shift network is placed in the transmitter branch affecting the transmission signal but having minimal or no impact on the receive signal. The second phase shift network may be placed in the receiver branch affecting the phase of the receive signal but having minimal or no impact on the transmit signal. By this method both the transmission and receive signals may be compensated for phase changes such as changes from gripping the phone differently, or changes from operation of the antenna tuning network. Devices with multiple transmitters or receivers may have multiple phase shift networks.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations.

Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A communication device comprising:
   an antenna;
   a tuning network;
   a phase shift network that receives baseband signals from a base station; and
   a controller communicatively linked to the tuning network and to the phase shift network, wherein the controller receives data regarding the state of the communication device and, based on the received data,
   operates the tuning network to change its impedance so that the impedance of the tuning network is more closely matched to that of the antenna than it was before the change; and
   operates the phase shift network to shift the phase of the baseband signals received from the base station thereby compensating for a phase shift to the received baseband signals caused by the change in the impedance of the tuning network.

2. The communication device of claim 1, wherein the state data received by the controller comprises data regarding the state of the antenna, the communication device further comprising:
   a sensor that detects the state of the antenna and transmits the antenna state data to the controller.

3. The communication device of claim 1, wherein the state data received by the controller comprises data regarding one or more of a band, sub-band, or channel on which the communication device is communicating, the communication device further comprising:
   a transceiver module that controls which band, sub-band or channel the communication device is communicating and indicates, to the controller, which band, sub-band, or channel over which the communication device is communicating.

4. The communication device of claim 1, wherein the state data received by the controller comprises data regarding an application for which the communication device is being used, the communication device further comprising:
   an application processor,
   a sensor that
   detects conditions that are being experienced by the communication device,
   transmits data regarding the conditions to the application processor,
   wherein the application processor determines, based on the conditions data, the application for which the communication device is being used, and transmits data regarding the determined application to the controller.

5. The communication device of claim 4, wherein the sensor is selected from a group consisting of an acoustic sensor, a motion sensor, a heat sensor, an inertial sensor, a moisture sensor, and a magnetic sensor.

6. The communication device of claim 1, wherein the state data received by the controller comprises:
   data regarding at least one of the band, sub-band or channel on which the communication device is communicating,
   data regarding an application for which the communication device is being used,
   data regarding the state of the antenna, and
   data regarding the state of at least one of a transmit modulator and receive modulator of the communication device.

7. The communication device of claim 1, wherein the controller stores values that associate the state of the communication device with settings of the tuning network and adjusts the impedance of the tuning network based on the stored values.

8. The communication device of claim 1, further comprising:
   a transmit modulator, wherein the state data received by the controller comprises data regarding the state of the transmit modulator, wherein the transmit modulator
   receives baseband signals from the phase shift network,
   modulates the baseband signals thereby generating radio-frequency signals,
   provides the radio frequency signals to the antenna, and
   transmits the transmit modulator state data to the controller.

9. The communication device of claim 1, further comprising:
   a receive demodulator, wherein the state data received by the controller comprises data regarding the state of the receive demodulator, wherein the receive demodulator receives radio-frequency signals from the antenna, demodulates the radio-frequency signals into baseband signals, provides the baseband signals to the phase shift network, and transmits data regarding the state of the receive demodulator to the controller.

10. The communication device of claim 1,
    wherein the controller operates the tuning network to change the impedance of the tuning network at a first time, and operates the phase shift network to change the phase shift of the phase shift network at a second time,
    wherein the difference between the first time and the second time is related to the propagation delay through at least one of the tuning network and the phase shift network.

11. A method for compensating for phase shift on a communication device, the method comprising:
    determining the state of the communication device;
    adjusting the phase of a baseband signal received from base station based on the determined state; and
    adjusting the impedance of a load electrically coupled to an antenna of the device based on the determined state, wherein the phase of the baseband signal received from the base station is adjusted to compensate for a phase shift to the received baseband signal caused by a change in the impedance of the load.

12. The method of claim 11, wherein the baseband signal is received from a receive demodulator.

13. The method of claim 11, wherein the baseband signal is transmitted to a transmit modulator.

14. The method of claim 11,
    wherein determining the state of the communication device comprises detecting the state of an antenna of the communication device,
    wherein adjusting the phase of the baseband signal comprises adjusting the phase based on the detected antenna state;
    wherein adjusting the impedance of the load comprises adjusting the impedance based on the detected antenna state.

15. The method of claim 11,
wherein determining the state of the communication device comprises determining at least one of the band, sub-band, and channel on which the communication device is communicating,
wherein adjusting the phase of the baseband signal comprises adjusting the phase based on the determined at least one of a band, sub-band, and channel, and
wherein adjusting the impedance of the load comprises adjusting the impedance based on the determined at least one of a band, sub-band, and channel on which the communication device is communicating.

16. The method of claim 11,
wherein determining the state of the communication device comprises determining an application for which the communication device is being used,
wherein adjusting the phase of the baseband signal comprises adjusting the phase based on the determined application, and
wherein adjusting the impedance of the load comprises adjusting the impedance based on the determined application.

17. The method of claim 16, wherein determining the application for which the communication device is being used comprises determining how the communication device is being held by a user.

18. The method of claim 11,
wherein determining the state of the communication device comprises determining the state of at least one of a transmit modulator and a receive demodulator,
wherein adjusting the phase of the baseband signal comprises adjusting the phase based on the determined state of the at least one of a transmit modulator and a receive demodulator, and
wherein adjusting the impedance of the load comprises adjusting the impedance based on the determined state of the at least one of a transmit modulator and a receive demodulator.

19. A method for compensating for phase shift in a communication device, the method comprising:
receiving data regarding, at least one of a band, sub-band, and channel over which the communication device is communicating; the state of at least one of a modulator and demodulator being used by the communication device; an application for which the communication device is being used; and the state of an antenna of the communication device,
adjusting the impedance of a matching network coupled to an antenna being used by the communication device to receive baseband signals base on the received data; and
adjusting the phase shift of a baseband signal received from a base station by a phase shift network based on the received data to compensate for the phase shift to the received baseband signals caused by the adjusted impedance of the matching network.

20. The method of claim 19, further comprising:
referencing a lookup table that associates the at least one of the band, sub-band, or channel, the state of at least one of the transmission modulator and receive demodulator, the application for which the communication device is being used, and the state of the antenna with values usable to perform the adjusting steps.

* * * * *

UNITED STATES PATENT AND TRADEMARK OFFICE
CERTIFICATE OF CORRECTION

PATENT NO. : 9,281,849 B2
APPLICATION NO. : 13/478811
DATED : March 8, 2016
INVENTOR(S) : Gregory R. Black et al.

It is certified that error appears in the above-identified patent and that said Letters Patent is hereby corrected as shown below:

In the Claims:

Claim 11, Col. 14, Line 45, before "base station" please insert -- a --.

Claim 19, Col. 16, Line 19, please replace "signals base" with -- signals based --.

Signed and Sealed this
Fourteenth Day of June, 2016

Michelle K. Lee
*Director of the United States Patent and Trademark Office*